US008745005B1

(12) United States Patent
DeSouter et al.

(10) Patent No.: US 8,745,005 B1
(45) Date of Patent: Jun. 3, 2014

(54) CHECKPOINT RECOVERY USING A B-TREE INTENT LOG WITH SYNCPOINTS

(75) Inventors: Marc DeSouter, Wayne, NJ (US); Pranit Sethi, Piscataway, NJ (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/536,952

(22) Filed: Sep. 29, 2006

(51) Int. Cl.
*G06F 7/00* (2006.01)
*G06F 17/30* (2006.01)

(52) U.S. Cl.
USPC .......................................... 707/648; 707/797

(58) Field of Classification Search
USPC .......................... 707/204, 644, 648, 640, 674
See application file for complete search history.

(56) References Cited

U.S. PATENT DOCUMENTS 4,819,156 A * 4/1989 DeLorme et al. ............... 714/15
5,644,763 A * 7/1997 Roy ............................. 707/101
5,758,356 A * 5/1998 Hara et al. .................... 707/202
6,535,869 B1 * 3/2003 Housel, III ........................ 707/2
6,578,041 B1 * 6/2003 Lomet ........................... 707/102
7,133,884 B1 * 11/2006 Murley et al. ................. 707/202
2002/0029214 A1 * 3/2002 Yianilos et al. ................... 707/7
2004/0139125 A1 * 7/2004 Strassburg et al. ........... 707/202
2004/0220979 A1 * 11/2004 Young et al. .................. 707/203
2005/0071336 A1 * 3/2005 Najork et al. ...................... 707/8
2005/0125593 A1 * 6/2005 Karpoff et al. .................... 711/4
2005/0289152 A1 * 12/2005 Earl et al. ...................... 707/100
2006/0053139 A1 * 3/2006 Marzinski et al. ............ 707/101
2006/0106860 A1 * 5/2006 Dee et al. ...................... 707/102
2006/0129611 A1 * 6/2006 Adkins et al. ................. 707/202

OTHER PUBLICATIONS

Kornacker et al., Concurrency and Recovery in Generalized Search Trees, SIGMOD '97, published 1997.*

* cited by examiner

*Primary Examiner* — Jeffrey A Burke
(74) *Attorney, Agent, or Firm* — Anderson Gorecki & Rouille LLP

(57) ABSTRACT

A networked data storage system includes a primary volume and a pointer-based virtual secondary volume. The secondary volume has B-tree checkpoints of the state of a primary file-system of the primary volume. Intermediate syncpoints are declared between checkpoint checkpoints. The syncpoints are logical locations on the secondary volume where the B-tree is known to be in a consistent state. The frequency of syncpoints may be set by an administrator in units of blocks, i.e., a syncpoint to be taken every n blocks. Before performing a B-tree split, entire images of the leaves and parent node involved in the split are written to an intent log in a relatively fast transaction that may comprise a single I/O operation to contiguous memory. Movement of data between leaf nodes and changes to the parent nodes as a result of the split operation proceed asynchronously. In the event of a reboot before the split operation is complete, the intent log is used to complete the split transaction from the most recent syncpoint. When a new syncpoint is declared, the intent log and dirty leaves are flushed.

20 Claims, 4 Drawing Sheets

CHECKPOINT RECOVERY USING A B-TREE INTENT LOG WITH SYNCPOINTS

FIELD OF THE INVENTION

This invention is generally related to the field of data storage, and more particularly to checkpoint recovery in a secondary volume of a data storage system.

BACKGROUND OF THE INVENTION

The use of electronic data storage is widespread in the industrialized world. Business and personal records that might previously have been stored in both paper and electronic form are often now stored only in electronic form. Various data protection techniques (e.g., file system checkpoints) have been conceived to enable recovery of data that would otherwise be lost when physical storage devices fail, become corrupted, or have been inadvertently lost. However, these techniques are continually being forced to scale to support larger collections of data because of the adoption of networked storage and the relatively rapid increase in the amount of data being created. In view of this situation, it is desirable to have techniques for facilitating recovery from device failure and data corruption while preserving good performance for client access from a network.

SUMMARY OF THE INVENTION

In accordance with one embodiment of the invention, apparatus for facilitating recovery of a secondary volume, containing checkpoints, having data indicative of changes made to data on a primary volume includes: monitoring circuitry operable to identify a synchronization point where a secondary volume B-tree is known to be consistent; and an intent log indicative of inconsistency in the secondary volume B-tree since a most recently identified synchronization point.

In accordance with another embodiment of the invention, computer program code stored on computer readable media, and executable by a computer, for facilitating recovery of a secondary volume, containing checkpoints, having data indicative of changes made to data on a primary volume, includes: logic operable to identify a synchronization point where a secondary volume B-tree is known to be consistent; and logic operable to maintain an intent log indicative of inconsistency in the secondary volume B-tree since a most recently identified synchronization point.

In accordance with another embodiment of the invention, a method for facilitating recovery of a secondary volume B-tree having data indicative of changes made to data on a primary volume includes the steps of: in response to an indication that a first leaf node of the B-tree is ready to split, allocating a second leaf node to the B-tree; initiating splitting the first leaf node in memory into the first and second leaf nodes; writing an intent log including an image of the leaf nodes and parent node that will result from the split; and asynchronously writing the first and second leaf nodes and the parent node.

One of the primary advantages of the invention is improved recovery time. For a relatively large checkpoint, recovery time to rebuild a consistent secondary volume B-tree can be significant in terms of both processor time and disk utilization. Since checkpoint recovery must be completed before user filesystems can be accessed on the primary volume, recovery time can adversely affect productivity. Synchronization points enable the recovery operation to be initiated from a nearer point in time to a reboot operation. Further, the intent log facilitates rapid recovery of the B-tree from the synchronization point when a split was in progress at the time when the event which lead to the reboot occurred. Through modeling, the invention, in one embodiment, has been found to have the potential for reducing recovery of a 1 TB checkpoint from about one hour to about sixty seconds, and potentially to under one second.

DETAILED DESCRIPTION

Figure 1:
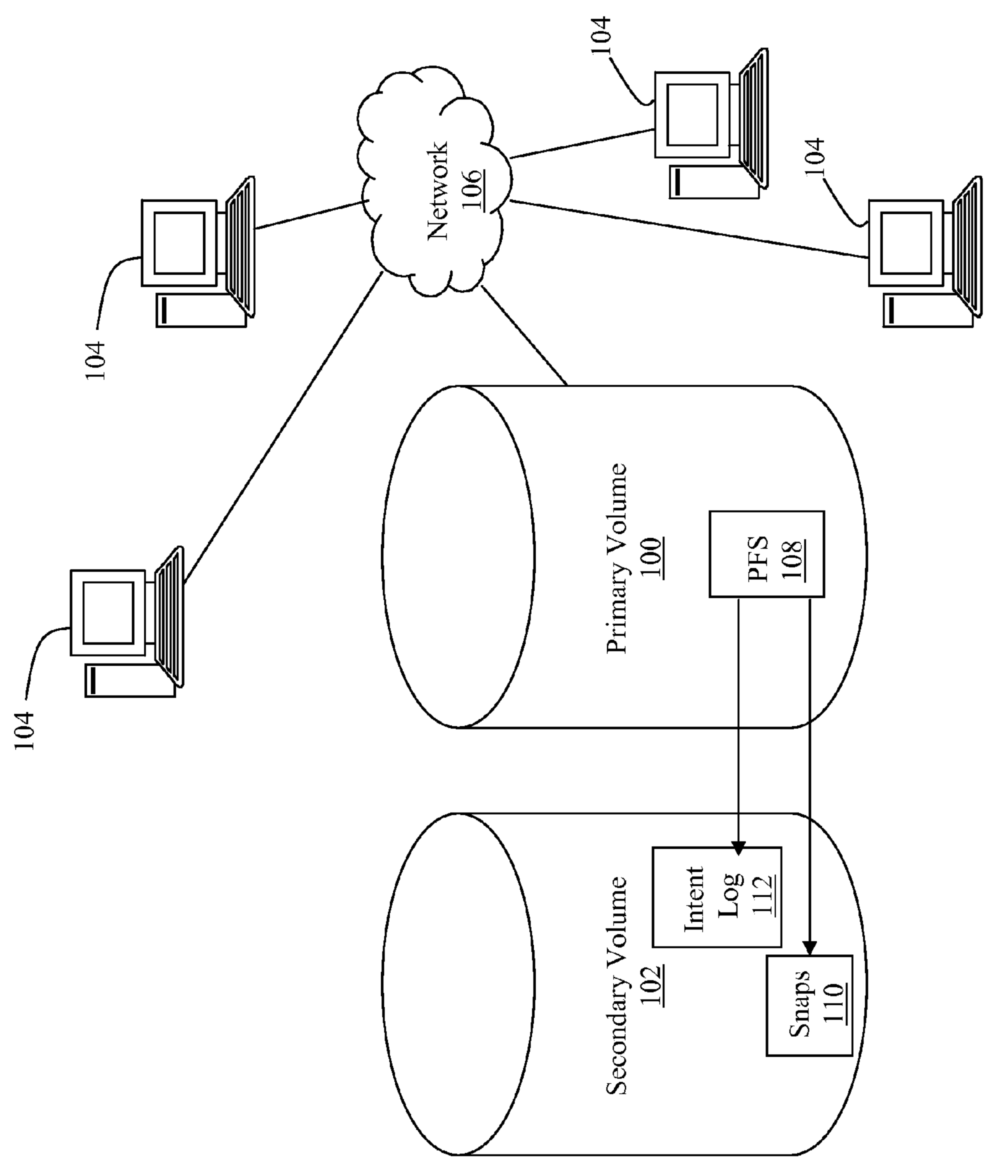
FIG. 1 illustrates a network architecture including a secondary volume with checkpoints of a primary filesystem and an intent log.

Referring to FIG. 1, a networked data storage system includes a primary volume (100) and a pointer-based virtual secondary volume (102). Devices (104) in communication with the network (106) utilize the primary volume (100) for data storage. The location of files on the primary volume (100) is referenced by a primary filesystem (108). The secondary volume (102) is employed to maintain checkpoints (110) of the state of the primary filesystem (100) at various points in time. One function of the checkpoints is to enable recreation of the state of the primary filesystem (100) at any of various points in time, including the state just prior to a failure. In other words, the checkpoints (110) include primary filesystem (108) data that has been changed.

It should be noted that both the primary volume (100) and the secondary volume (102) may be associated with multiple physical storage devices, and may be scaled in m:n relation. In one embodiment, the secondary volume (102) is associated with different physical storage devices than the primary volume (100). One secondary volume may be operable to support multiple primary volumes. However, a single primary volume will be discussed in this description for the sake of clarity.

Figure 2:
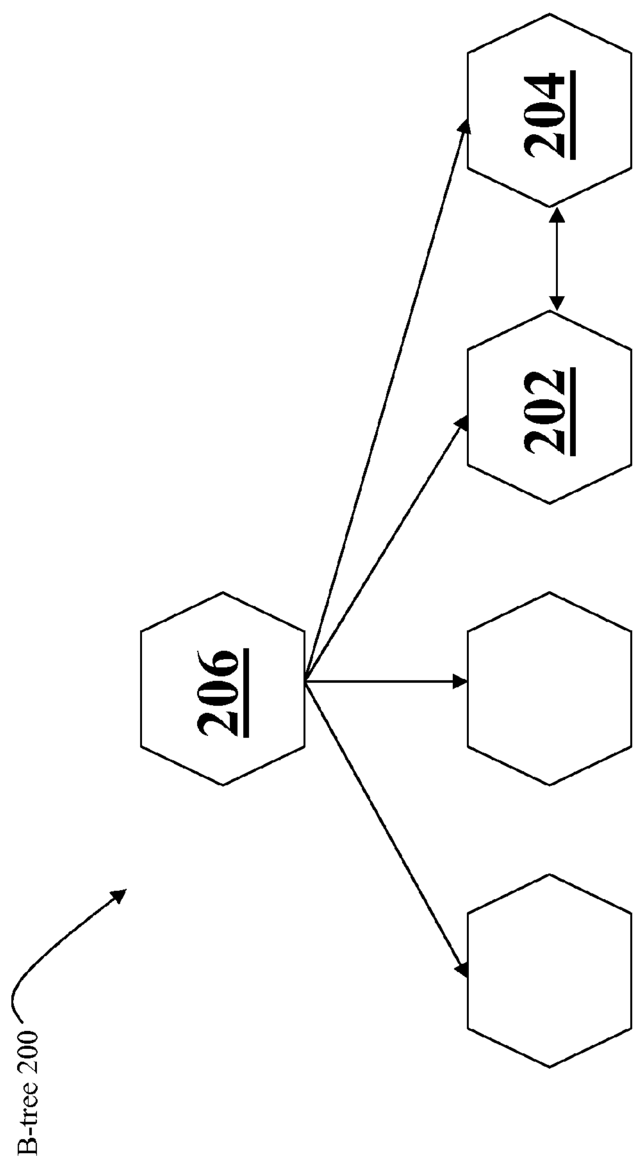
FIG. 2 illustrates a B-tree split.

Referring to FIGS. 1 and 2, the checkpoints (110) of the primary filesystem (108) stored in the secondary volume (102) are maintained in the form of B-trees, e.g., B-tree (200). In particular, the B-trees maintain a set of blockmaps of snapped data blocks. B-trees are balanced tree data structures that are commonly found in databases and filesystems. B-trees keep data sorted and allow amortized logarithmic time insertions and deletions. Internal nodes can have a variable number of child nodes within some pre-defined range. When data is inserted or removed from the data structure, the number of child nodes can change via join and split operations. The B-tree is kept balanced by requiring all leaf nodes, e.g., leaf node (202), to be at the same depth. This depth increases as elements are added to the tree, but an increase in the overall depth is infrequent, and results in all leaf nodes being one more hop further removed from the root. Newly snapped blocks add a blockmap entry to the B-tree. Newly snapped blocks that do not cause a B-tree split have their mappings added directly to leaf nodes. As will be discussed in greater detail below, newly snapped blocks that cause split operations are somewhat more complex.

Figure 3:
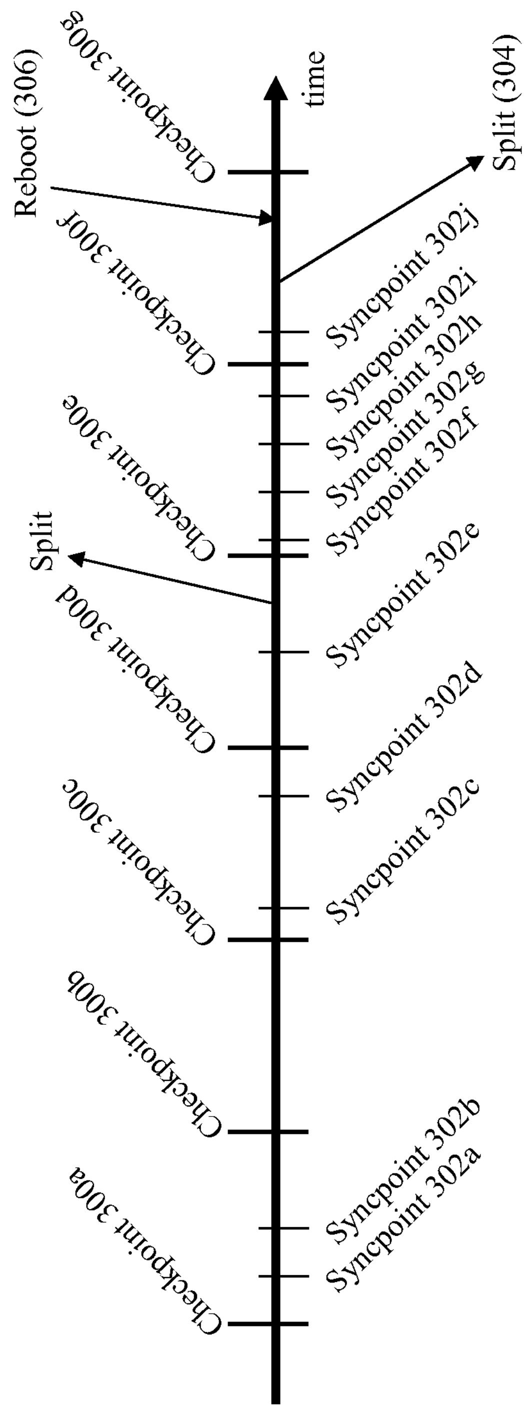
FIG. 3 illustrates operation of the storage in FIG. 1.
Figure 5:
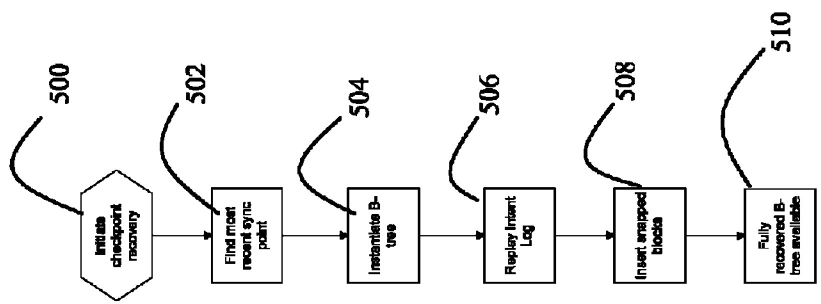
FIG. 5 is a flow diagram of a checkpoint recovery operation.
Figure 4:
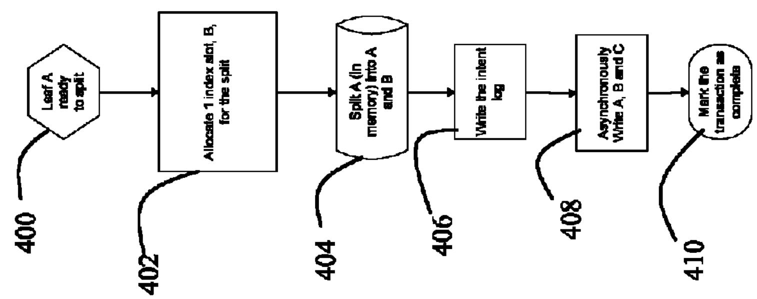
FIG. 4 is a flow diagram of the B-tree split.

Referring now to FIGS. 1, 2 and 3, the state of the primary volume (100) and the secondary volume (102) change over time as the primary volume is utilized. Checkpoints (300*a*-300*g*) occur periodically in accordance with system configuration. For example, and without limitation, checkpoints can be set by an administrator to occur hourly, daily or monthly. Each checkpoint is indicative of the secondary volume (102) having the original content of all changes made to the primary volume (100).

In order to facilitate recovery operations, intermediate syncpoints (302a-302j) are declared between checkpoints. For example, syncpoint (302e) occurs between checkpoint (300d) and checkpoint (300e). The syncpoints are logical locations on the secondary volume (102) where the B-tree is known to be in a consistent state. In particular, the syncpoint represents a state when the B-tree is stable on disk. Between syncpoints, all interior nodes are in a consistent state, but leaf nodes may be inconsistent with respect to the changed blocks on the primary file system. During checkpoint recovery, the secondary volume is used to re-populate any missing blockmap entries in the leaves. The frequency of syncpoints may be set by an administrator in units of blocks, i.e., a syncpoint to be taken every n blocks.

An intent log (112) on the secondary volume (102) further facilitates recovery operations. Before performing a B-tree split, the leaves involved in the split and their parent nodes are written to the intent log (102), i.e., the entire images of the changed leaves and parent. The intent log Write operation is relatively fast, and may comprise a single I/O operation to contiguous memory associated with the secondary volume (102). The movement of data between leaf nodes and changes to the parent nodes as a result of the split operation are done asynchronously, and typically to non-contiguous memory in a relatively lengthy background process, e.g., by a paging daemon. In the event of a failure during the time in which the movement of data between the leaf nodes or update of the parent node is incomplete, the intent log (112) is used to complete the split transaction. When a new syncpoint is declared, the intent log and dirty leaves are flushed.

Referring now to FIGS. 1 through 4, a specific example of a split (304) operation will be described. The B-tree split operation begins when leaf (202) is ready to split, as indicated by step (400). In response, secondary volume space is allocated for the split, i.e., leaf (204), as indicated in step (402). Leaf (202) is then split into leaf (202) and leaf (204), as indicated in step (404). The intent log (112) is then written with the contents of leaf (202) and leaf (204), as indicated in step (406). In particular, the intent log is written such that it is apparent which data is associated with leaf (202) and which data is associated with leaf (204). Since node (206), which holds the relevant keys, will also change, that is also written to the intent log (112). The intent log should be large enough to hold enough nodes for the worst case split, e.g., two leaves, five interior nodes, therefore seven nodes. Further, one I/O write operation is used in order to separately save a pointer to the intent log, thereby marking the transaction in-progress. Leaf (202), leaf (204) and node (206) are then asynchronously written on the secondary volume as indicated by step (408). Once step (408) is completed, the transaction is marked as complete, as indicated by step (410). In one embodiment, only one pending split transaction is permitted per B-tree. If there is a pending split transaction when a new split becomes ready to occur, the new split is queued until the intent log is flushed.

Referring now to FIGS. 1 through 3 and 5, a specific example of a recovery operation will be described. A checkpoint recovery operation is initiated, as shown in step (500), in response to a failure or reboot (306). The start point for the recovery operation is finding the most recent syncpoint (302j), as show in step (502). Once the most recent syncpoint is located, the B-tree is instantiated as shown in step (504). However, the B-tree is not yet complete with respect to snapped blocks. The intent log (112) is then replayed as shown in step (506). The intent log is indicative of the split (304) operation that was in progress. The snapped blocks are then inserted into the appropriate leaves in the B-tree, as indicated by step (508). A fully recovered B-tree is then available, as shown in step (510). If the intent log had been empty, i.e., no split had been in progress, then the B-tree indicated by the most recent syncpoint would be utilized.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for facilitating recovery of a secondary volume having data indicative of changes made to data on a primary volume comprising:

monitoring circuitry that identifies a synchronization point where a secondary volume B-tree is known to be consistent;

circuitry that writes, in response only to an impending B-tree split, all B-tree nodes involved in the impending split into an intent log before the split is performed, the intent log thereby being indicative of inconsistency in the secondary volume B-tree since a most recently identified synchronization point; and circuitry which, in response to a failure or reboot occurring when movement of data between B-tree leaf nodes or update of a B-tree parent node is incomplete, uses the intent log to complete the split by finding the synchronization point, instantiating the B-tree, replaying the intent log, and inserting snapped blocks into appropriate leaves of the instantiated B-tree.

2. The apparatus of claim 1 wherein the secondary volume B-tree includes data indicative of changes made to a filesystem on the primary volume.

3. The apparatus of claim 2 further including circuitry that asynchronously writes nodes to the B-tree in response to the split.

4. The apparatus of claim 3 wherein the intent log stores an indication of the split of the B-tree which is in progress.

5. The apparatus of claim 4 wherein the intent log is flushed when the B-tree split is complete.

6. The apparatus of claim 4 wherein the intent log includes an image of leaf nodes and parent nodes that will result from the split.

7. The apparatus of claim 6 wherein the intent log is written in a single I/O operation.

8. The apparatus of claim 6 wherein the intent log is written to contiguous locations in memory.

9. Computer program code stored on computer readable media, and executable by a computer, for facilitating recovery of a secondary volume having data indicative of changes made to data on a primary volume, comprising:

logic that identifies a synchronization point where a secondary volume B-tree is known to be consistent;

logic that writes, in response only to an impending B-tree split, all B-tree nodes involved in the split into an intent log before the split is performed, the intent log thereby being indicative of inconsistency in the secondary volume B-tree since a most recently identified synchronization point; and logic which, in response to a failure or reboot occurring when movement of data between B-tree leaf nodes or update of a B-tree parent node is incomplete, uses the intent log to complete the split by finding the synchronization point, instantiating the B-tree, replaying the intent log, and inserting snapped blocks into appropriate leaves of the instantiated B-tree.

10. The program code of claim 9 wherein the secondary volume B-tree includes data indicative of changes made to a filesystem on the primary volume.

11. The program code of claim 10 further including logic that asynchronously writes nodes to the B-tree in response to a split.

12. The program code of claim 11 wherein the intent log logic stores an indication of a split of the B-tree which is in progress.

13. The program code of claim 12 wherein the intent log logic flushes the intent log when the B-tree split is complete.

14. The program code of claim 12 wherein the intent log logic stores, in the intent log, an image of leaf nodes and parent node that will result from the split.

15. The program code of claim 14 wherein the intent log logic causes the intent log to be written in a single I/O operation.

16. The program code of claim 14 wherein the intent log is written to contiguous locations in memory.

17. A method for facilitating recovery of a secondary volume B-tree having data indicative of changes made to data on a primary volume, comprising the steps of:

in response to an indication that a first leaf node of the B-tree is ready to split, allocating a second leaf node to the B-tree;

initiating splitting the first leaf node in memory into the first and second leaf nodes;

writing, in response only to the impending B-tree split, an image of the leaf nodes and parent node that will result from the split into an intent log; and in response to a failure or reboot occurring when movement of data between the leaf nodes or update of the parent node is incomplete, using the intent log to complete the split by finding a most recent synchronization point, instantiating the B-tree, replaying the intent log, and inserting snapped blocks into appropriate leaves of the instantiated B-tree.

18. The method of claim 17 wherein the primary volume data set is a filesystem, and including the further step of identify a synchronization point where the B-tree structure is known to be consistent before writing into the intent log.

19. The method of claim 18 wherein the intent log is indicative of inconsistency in the B-tree since a most recently identified synchronization point.

20. The method of claim 19 including the further step of, in response to initiation of a recovery operation, finding the most recent synchronization point.

* * * * *